(12) United States Patent
Kang et al.

(10) Patent No.: US 9,164,323 B2
(45) Date of Patent: Oct. 20, 2015

(54) DISPLAY DEVICE

(71) Applicant: Shenzhen China Star Optoelectronics Technology Co., Ltd., Shenzhen, Guangdong (CN)

(72) Inventors: Chih-Tsung Kang, Guangdong (CN); Bo Hai, Guangdong (CN)

(73) Assignee: SHENZHEN CHINA STAR OPTOELECTRONICS TECHNOLOGY CO., LTD., Shenzhen (CN)

( * ) Notice: Subject to any disclaimer, the term of this patent is extended or adjusted under 35 U.S.C. 154(b) by 361 days.

(21) Appl. No.: 13/703,030

(22) PCT Filed: Oct. 19, 2012

(86) PCT No.: PCT/CN2012/083240
§ 371 (c)(1),
(2) Date: Dec. 9, 2012

(87) PCT Pub. No.: WO2014/040333
PCT Pub. Date: Mar. 20, 2014

(65) Prior Publication Data
US 2014/0176882 A1    Jun. 26, 2014

(30) Foreign Application Priority Data
Sep. 11, 2012 (CN) .......................... 2012 1 0334318

(51) Int. Cl.
*G02F 1/1335* (2006.01)
*G02B 5/30* (2006.01)
*G02F 1/13363* (2006.01)
(Continued)

(52) U.S. Cl.
CPC ........ *G02F 1/133634* (2013.01); *G02B 5/3033* (2013.01); *G02F 2001/133635* (2013.01); *G02F 2413/01* (2013.01); *G02F 2413/02* (2013.01); *G02F 2413/05* (2013.01); *G02F 2413/12* (2013.01)

(58) Field of Classification Search
CPC .......... G02F 1/13363; G02F 1/133528; G02F 1/133634; G02F 2001/133638; G02F 2202/40; G02F 2413/08; G02F 2001/133531; G02F 2201/50; G02F 2413/11; G02F 2001/133541; G02F 2001/133543; G02F 2413/12; G02B 5/3083; G02B 27/283; G02B 5/3025; G02B 27/28; G02B 5/30; G02B 5/3016; G02B 1/105; G02B 6/2766; G02B 6/0056; G02B 6/2773; G02B 1/08; G02B 5/3066; G02B 5/32

See application file for complete search history.

(56) References Cited

U.S. PATENT DOCUMENTS

| | | | |
|---|---|---|---|
| 2005/0030447 A1* | 2/2005 | Hsu et al. | 349/102 |
| 2005/0162593 A1* | 7/2005 | Miyachi | 349/119 |
| 2007/0195226 A1* | 8/2007 | Aminaka et al. | 349/96 |

*Primary Examiner* — Paisley L Arendt
*Assistant Examiner* — Angela Davison

(57) ABSTRACT

A display device comprises a VA liquid crystal display unit as well as a front side polarizer and a rear side polarizer arranged respectively at both side of the VA liquid crystal display unit; wherein the VA liquid crystal display unit has an optical path difference Δnd of 324.3 nm to 305.8 nm at the wavelength of 550 nm; the front side polarizer is arranged at a side in the light-exiting direction of the VA liquid crystal unit; one of the front side polarizer and the rear side polarizer includes the biaxial compensation film, which has an in-plane delay Ro of 50.4-78 nm at the wavelength of 550 nm and a thickness direction delay Rth-b of 168-260 nm at the wavelength of 550 nm. The amount of light leakage is significantly reduced with the contrast close to the horizontal viewing angle obviously increased and the display effect further improved.

4 Claims, 10 Drawing Sheets

(51) Int. Cl.
*G02B 27/28* (2006.01)
*C09K 19/00* (2006.01)

DISPLAY DEVICE

FIELD OF THE INVENTION

The present invention relates to the liquid crystal display, especially relates to a display device used in a VA display mode.

BACKGROUND OF THE INVENTION

With the observation angle of TFT-LCD increasing, the image contrast has been reduced continuously, and the image definition is decreased. This is due to the birefringence of liquid crystal molecules in the liquid crystal layer changing along with the observation angle. Compensating with a compensation film of a wide viewing angle can reduce light leakage of the dark state image effectively, and increase the image contrast significantly in a certain range of viewing angles. The compensation film (or called the delay film) has the general compensation principle of correcting the phase difference generated by the liquid crystal at different viewing angles, so that the birefringent property of the liquid crystal molecules is symmetrically compensated. Different compensation films are used for different liquid crystal display modes. The compensation films used in a large-sized liquid crystal TV are mostly targeted in the VA display mode, including N-TAC of the Konica company in the early stage, and Zeonor of the OPOTES company, the F-TAC series of the Fujitsu company, X-plate of the Nitto Denko, etc. developed continuously afterwards.

FIG. 1 is an exploded drawing of the display device in the existing technology. As shown in FIG. 1, this display device includes a VA (Vertical Alignment) liquid crystal unit 300 and an optical compensation structure, the latter further including a front side polarizer 100 and a rear side polarizer 200 arranged at both sides of the VA liquid crystal unit 300. Wherein the front side polarizer 100 is arranged at the side in the light-exiting direction of the VA liquid crystal unit 300 (here the light-exiting direction is defined to be the direction of the backlight source 400 oriented to the viewer 500), including a front side polarization unit 110 as well as a second front side TAC film 120 arranged between the front side polarization unit 110 and the VA liquid crystal unit 300. The rear side polarizer 200 includes a rear side polarization unit 220 as well as a rear side biaxial film 210 arranged between the rear side polarization unit 220 and the VA liquid crystal unit 300, the rear side biaxial compensation film 210 having the function of both a delay film and a protection film.

The view angle of the liquid crystal display device (e.g. a liquid crystal TV) is usually called a viewing angle range, which includes two indexes, i.e. a horizontal view angle and a vertical view angle. The horizontal view angle of the liquid crystal display device refers to an angle range within which the display image can still be normally seen at a position perpendicular to the normal to the left or right at a certain angle with the vertical normal of the liquid crystal unit as the reference. Similarly, if the horizontal normal of the liquid crystal unit is taken as the reference, the up-and-down view angle is called the vertical view angle. For convenient description in this application, the horizontal normal 300a of the VA liquid crystal unit is used as the reference for calibration of the direction.

In the existing optical compensation structure, the absorption axis 110a of the front side polarization unit 110 is parallel to the horizontal normal 300a, and the slow axis 120a of the second front side TAC film 120 is perpendicular to the horizontal normal 300a; the absorption axis 220a of the rear side polarization unit 220 is perpendicular to the horizontal normal 300a, and the slow axis 210a of the rear side biaxial compensation film 210 is perpendicular to the horizontal normal 300a.

The above optical compensation structure includes one layer of biaxial compensation film (the rear side biaxial compensation film 210), and is therefore also usually called a single-layered biaxial compensation film compensation structure. FIG. 2 is a dark-state light leakage profile of the single-layered biaxial compensation film compensation structure. It shows the full viewing angle dark-state light leakage distribution of the single-layered biaxial compensation film compensation structure, indicating that there is serious light leakage at phi=20°-40°, phi=140°-160°, phi=200°-220° and phi=310°-330°, i.e. there is serious dark-state light leakage at a viewing angle close to the horizontal position. However, the position of a viewer relative to the liquid crystal display device determines that the viewer is easier to see at a viewing angle close to the horizontal position. Therefore, the contrast and definition at the horizontal viewing angle have the biggest influence on the viewing effect.

In order to resolve the above problem, the solution commonly used at present is substituting the double-layered biaxial compensation film compensation structure for the above single-layered biaxial compensation film compensation structure. Still as shown in FIG. 1, in the double-layered biaxial compensation film compensation structure, the biaxial compensation film is substituted for the original second front side TAC film 120, making both the front side polarizer 100 and the rear side polarizer 200 as a polarizer with the biaxial delay film.

FIG. 3 is a dark-state light leakage profile of the double-layered biaxial compensation film compensation structure. It shows the full viewing angle dark-state light leakage distribution of the double-layered biaxial compensation film compensation structure, indicating that there is serious light leakage at phi=30°-60°, phi=120°-150°, phi=210°-240° and phi=300°-330°, which are between the horizontal and vertical viewing angles. Generally, the contrast and definition at the horizontal viewing angle have the biggest influence on the viewing effect, while it is difficult to view at a big viewing angle (close to the vertical viewing angle), which thus has smaller influence on the viewer. It can thus be seen that using a double-layered biaxial compensation film compensation structure can improve the viewing effect.

Besides, FIGS. 4 and 5 show respectively the full viewing angle contrast profiles of the single-layered biaxial compensation film compensation structure and the double-layered biaxial compensation film compensation structure. It can be seen from FIGS. 4 and 5 that, the contrast of the double-layered biaxial compensation film compensation structure in FIG. 5 close to the horizontal viewing angle is significantly improved compared with that of the single-layered biaxial compensation film compensation structure in FIG. 4 close to the horizontal viewing angle, with the display effect further improved.

However, although the double-layered biaxial compensation film compensation structure improves the display effect, it will increase the cost of the display device, which makes the display device thus produced in an inferior position in the market competition.

Contents of the Invention

Aiming at the defect of the existing technology of not high contrast of the display device near the horizontal viewing angle, the technical problem to be resolved by the present invention is to provide a display device.

The present invention adopts the following technical solution to solve its technical problem: A display device is provided, comprising a VA liquid crystal display unit as well as a front side polarizer and a rear side polarizer arranged respectively at both side of the VA liquid crystal display unit; wherein:

the VA liquid crystal display unit has an optical path difference $\Delta$nd of 324.3 nm to 305.8 nm at the wavelength of 550 nm;

the front side polarizer is arranged at a side in the light-exiting direction of the VA liquid crystal unit; and one of the front side polarizer and the rear side polarizer includes the biaxial compensation film, which has an in-plane delay Ro of 50.4-78 nm at the wavelength of 550 nm and a thickness direction delay Rth-b of 168-260 nm at the wavelength of 550 nm.

In the display device according to the examples of the present invention:

the front side polarizer includes a front side polarization unit as well as a biaxial compensation film arranged between the front side polarization unit and the VA liquid crystal unit; and the rear side polarizer includes a rear side polarization unit as well as a first rear side TAC film arranged between the rear side polarization unit and the VA liquid crystal unit.

In the display device according to the examples of the present invention, the thickness direction delay Rth-t of the first rear side TAC film at the wavelength of 550 nm has a minimum value Y1 and a maximum value Y2 that are respectively defined through the following formulas:

$$Y1=0.0041 \times Rth\text{-}b^2-2.6179 \times Rth\text{-}b+408.46,$$

$$Y2=-0.0009 \times Rth\text{-}b^2-0.5472 \times Rth\text{-}b+244.95.$$

In the display device according to the examples of the present invention, the front side polarization unit includes a first front side TAC film as well as a front side PVA film arranged between the first front side TAC film and the biaxial compensation film; wherein:

the absorption axis of the front side PVA film is perpendicular to the slow axis of the biaxial compensation film; the slow axis of the first front side TAC film is parallel to the slow axis of the biaxial compensation film; and the absorption axis of the front side polarization unit is parallel to the horizontal normal of the VA liquid crystal unit.

In the display device according to the examples of the present invention, the rear side polarization unit includes a second rear side TAC film as well as a rear side PVA film arranged between the second rear side TAC film and the first rear side TAC film; wherein:

the absorption axis of the rear side PVA film is perpendicular to the absorption axis of the front side PVA film; the absorption axis of the rear side PVA film is perpendicular to the slow axis of the first rear side TAC film, and the slow axis of the second rear side TAC film is parallel to the slow axis of the first rear side TAC film; the absorption axis of the rear side polarization unit is perpendicular to the horizontal normal of the VA liquid crystal unit.

In the display device according to the examples of the present invention:

the front side polarizer includes a front side polarization unit as well as a second front side TAC film arranged between the front side polarization unit and the VA liquid crystal unit; the absorption axis of the front side polarization unit is perpendicular to the horizontal normal of the VA liquid crystal unit; and the rear side polarizer includes a rear side polarization unit as well as a biaxial compensation film arranged between the rear side polarization unit and the VA liquid crystal unit; and the absorption axis of the rear side polarization unit is parallel to the horizontal normal.

In the display device according to the examples of the present invention, the thickness direction delay Rth-t of the second rear side TAC film at the wavelength of 550 nm has a minimum value Y1 and a maximum value Y2 that are respectively defined through the following formulas:

$$Y1=0.0041 \times Rth\text{-}b^2-2.6179 \times Rth\text{-}b+408.46,$$

$$Y2=-0.0009 \times Rth\text{-}b^2-0.5472 \times Rth\text{-}b+244.95.$$

In the display device according to the examples of the present invention, the front side polarization unit includes a first front side TAC film as well as a front side PVA film arranged between the first front side TAC film and the second front side TAC film; wherein:

the absorption axis of the front side PVA film is perpendicular to the slow axis of the second front side TAC film, and the slow axis of the first front side TAC film is parallel to the slow axis of the second front side TAC film.

In the display device according to the examples of the present invention, the rear side polarization unit includes a second rear side TAC film as well as a rear side PVA film arranged between the second rear side TAC film and the biaxial compensation film; wherein:

the absorption axis of the rear side PVA film is perpendicular to the slow axis of the biaxial compensation film, and the second rear side TAC film is parallel to the slow axis of the biaxial compensation film.

In the display device according to the examples of the present invention, the VA liquid crystal unit is a multi-quadrant liquid crystal unit.

The present invention has the following beneficial effects: By setting a suitable delay value of the biaxial compensation film in the display device, the amount of light leakage is significantly reduced compared with the existing single-layered biaxial compensation film compensation structure, with the contrast close to the horizontal viewing angle increased obviously and the display effect further improved.

BRIEF DESCRIPTIONS OF THE DRAWINGS

The present invention will further be explained with reference to drawings and examples. In the drawings.

DETAILED DESCRIPTION OF THE EMBODIMENTS

In order to make the purpose, technical solutions and advantages of the present invention clearer, the present invention will further be explained in detail with reference to drawings and examples. It should be understood that the specific examples described here are only used for explaining the present invention rather than for limiting the present invention.

This application contains the terms "rear side" and "front side", which are orientation nouns for convenient description, wherein the "rear side" refers to being located between the liquid crystal unit and the backlight source, and the "front side" refers to being located between the liquid crystal unit and an viewer or the other side of the liquid crystal unit opposite to the backlight source. Besides, and the light-exiting direction is defined here to be the direction of the backlight source oriented to the viewer. It should be understood that each of the terms adopted above are only used for convenient description rather than for limiting the present invention.

The display device according to the example of the present invention includes a VA liquid crystal display unit as well as a front side polarizer and a rear side polarizer respectively arranged at both sides of the VA liquid crystal display unit. Wherein the VA liquid crystal display unit has an optical path difference $\Delta nd$ of 324.3 nm to 305.8 nm at the wavelength of 550 nm; the front side polarizer is arranged at a side in the light-exiting direction of the VA liquid crystal unit; one of the front side polarizer and the rear side polarizer includes the biaxial compensation film, which has an in-plane delay Ro of 50.4-78 nm at the wavelength of 550 nm and a thickness direction delay Rth-b of 168-260 nm at the wavelength of 550 nm.

Figure 6:
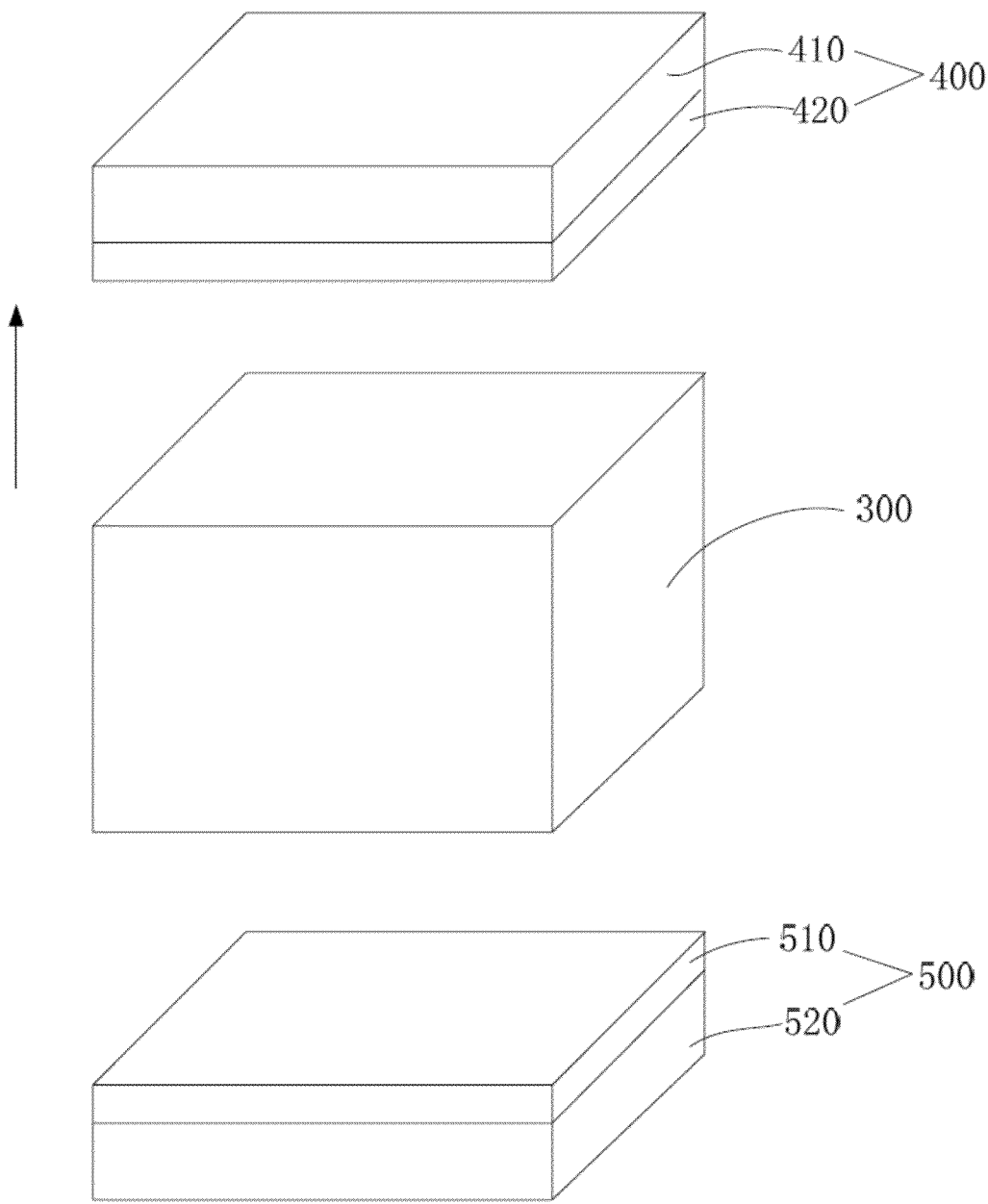
FIG. 6 is a structural schematic drawing of the display device of the first example according to the present invention.

FIG. 6 is a structural schematic drawing of the display device of the first example according to the present invention, which comprises a front side polarizer 400 and a rear side polarizer 500 arranged at both sides of a VA liquid crystal unit 300. Wherein the front side polarizer 400 is arranged at the side in the light-exiting direction of the VA liquid crystal unit 300 (as shown by the arrowhead in FIG. 6), including a front side polarization unit 410 as well as a front side biaxial compensation film 420 arranged between the front side polarization unit 410 and the VA liquid crystal unit 300. The rear side polarizer 500 includes a rear side polarization unit 520 as well as a first rear side TAC film 510 arranged between the rear side polarization unit 520 and the VA liquid crystal unit 300. Wherein the absorption axis 410a of the front side polarization unit 410 is parallel to the horizontal normal 300a; and the absorption axis 520a of the rear side polarization unit 520 is perpendicular to the horizontal normal 300a.

Preferably, the slow axis of the front side biaxial compensation film 420 is perpendicular to the absorption axis of the front side polarization unit 410; and the slow axis of the first rear side TAC film 510 is perpendicular to the absorption axis of the rear side polarization unit 520.

Figure 7:
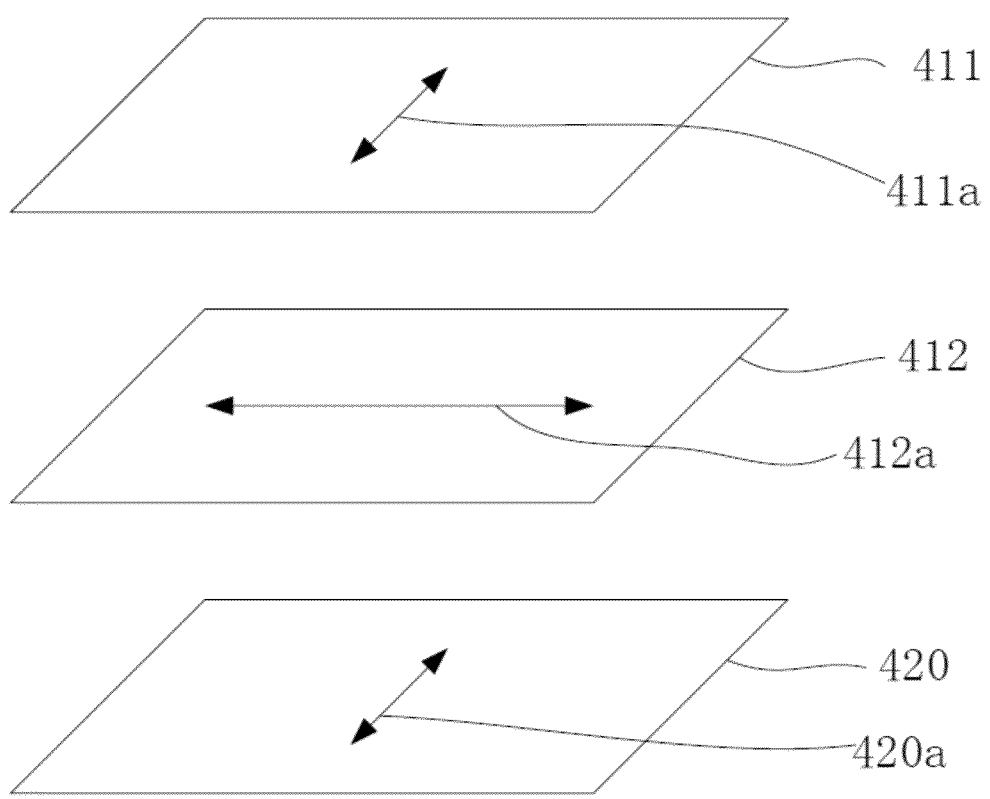
FIG. 7 is an exploded drawing of the front side polarizer 400 as shown in FIG. 6.

Specifically, FIG. 7 is an exploded drawing of the front side polarizer 400 as shown in FIG. 6, wherein the front side polarization unit of this front side polarizer 400 includes a first front side TAC film 411 as well as a front side PVA film 412 arranged between the first front side TAC film 411 and the front side biaxial compensation film 420; wherein the slow axis 411a of the first front side TAC film 411 is perpendicular to the absorption axis 412a of the front side PVA film 412, and the slow axis 411a of the first front side TAC film 411 is parallel to the slow axis 420a of the front side biaxial compensation film 420.

Figure 8:
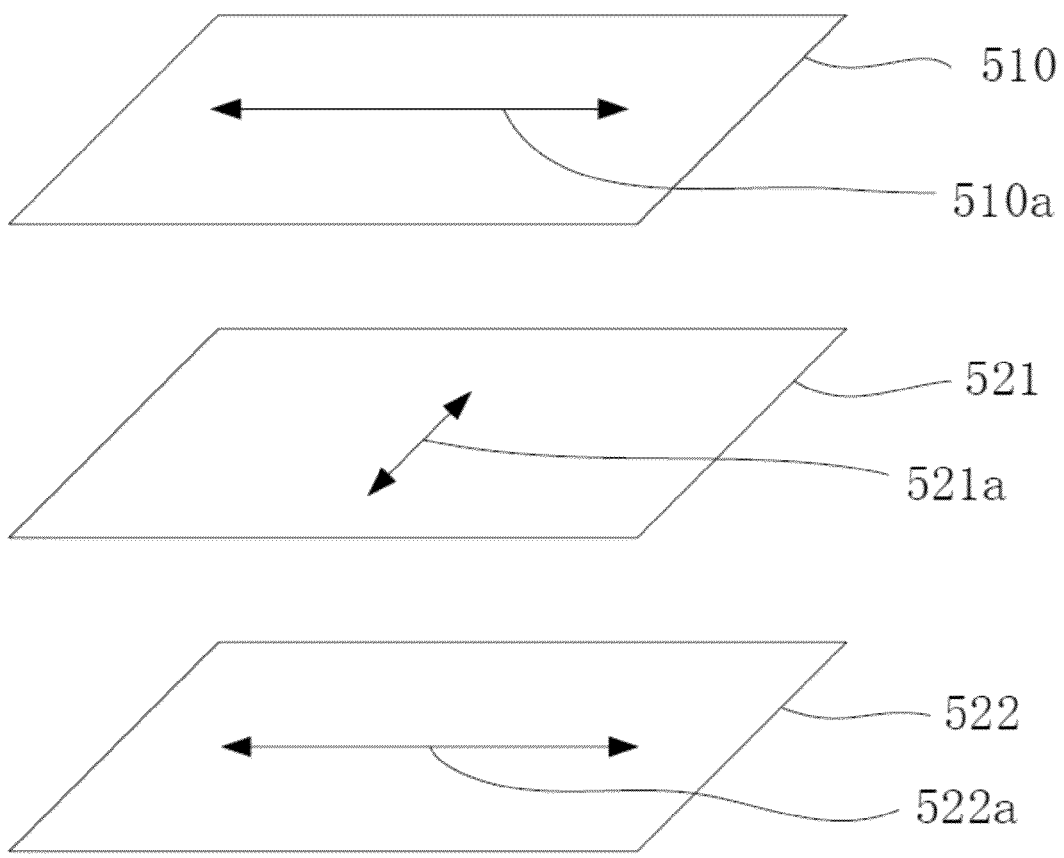
FIG. 8 is an exploded drawing of the rear side polarizer 500 as shown in FIG. 6.

FIG. 8 is an exploded drawing of the rear side polarizer 500 as shown in FIG. 6, wherein the rear side polarization unit 520 includes a second rear side TAC film 522 as well as a rear side PVA film 521 arranged between the second rear side TAC film 522 and the first rear side TAC film 510. Wherein the absorption axis 521a of the rear side PVA film 521 is perpendicular to the absorption axis 412a of the front side PVA film 412, and the slow axis 522a of the second rear side TAC film 522 is parallel to the slow axis 510a of the first rear side TAC film 510 and perpendicular to the absorption axis 521a of the rear side PVA film 521.

Figure 1:
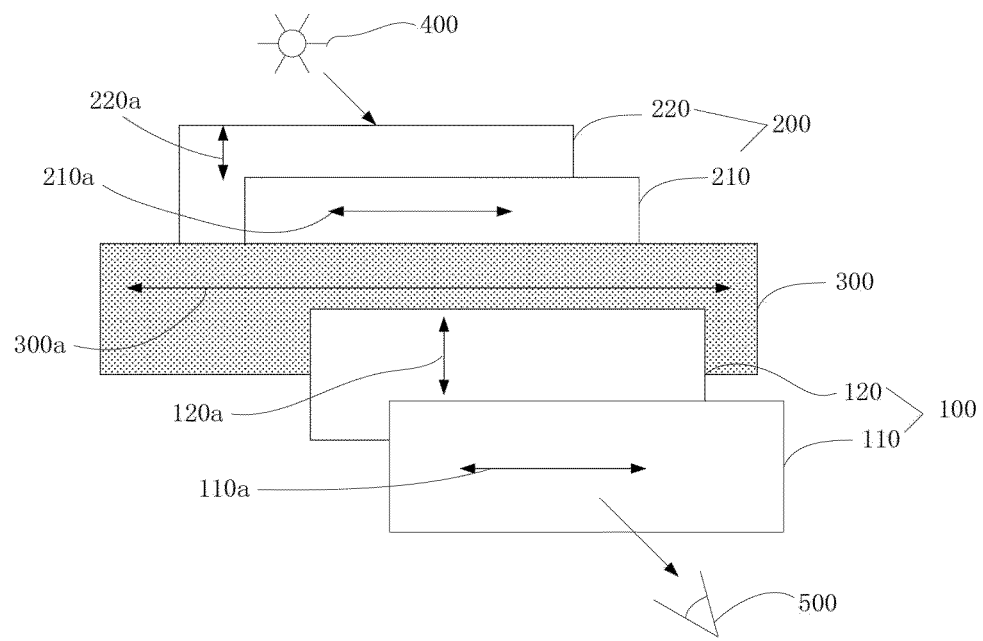
FIG. 1 is an exploded drawing of the display device in the existing technology.
Figure 2:
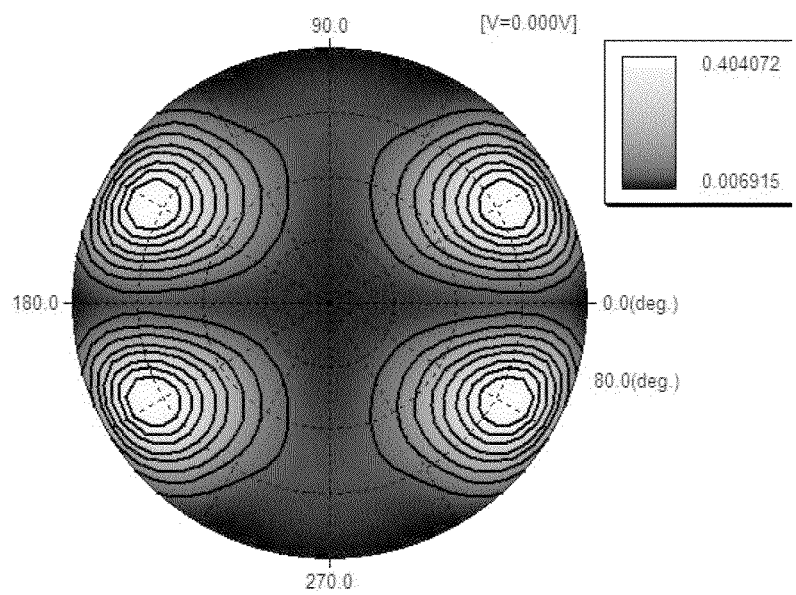
FIG. 2 is an isoluminance profile of dark-state light leakage distribution of the single-layered biaxial compensation film compensation structure.
Figure 3:
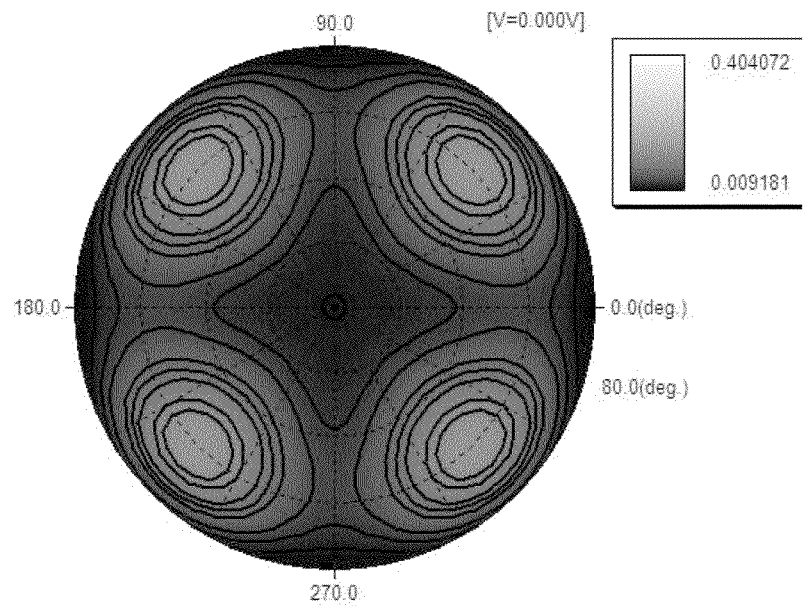
FIG. 3 is an isoluminance profile of dark-state light leakage distribution of the double-layered biaxial compensation film compensation structure.
Figure 9:
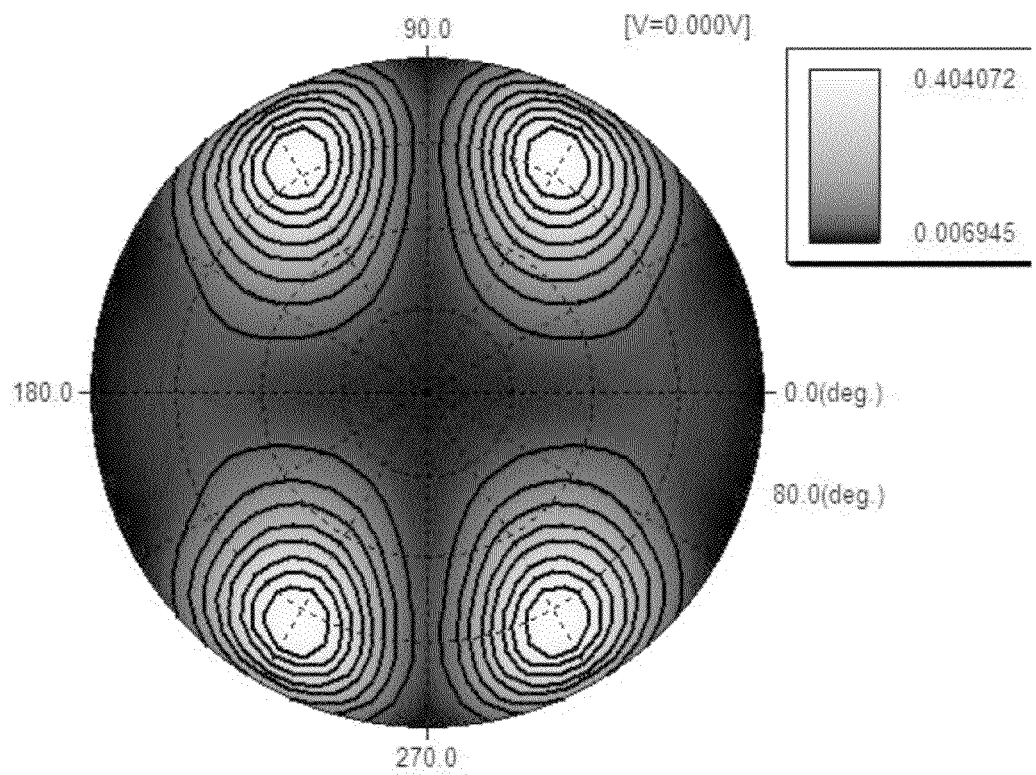
FIG. 9 is an isoluminance profile of the dark-state light leakage distribution of the display device as shown in FIG. 6.

It can be seen from above that the display device according to the examples of the present invention, compared with the existing double-layered biaxial compensation film compensation structure, only needs one layer of the biaxial compensation film 420; compared with the existing single-layered biaxial compensation film compensation structure, the biaxial compensation film 420 is arranged between the front side polarization unit and the liquid crystal unit, and no longer between the liquid crystal unit and the rear side polarization unit. FIG. 9 is a dark-state light leakage profile of the display device according to the examples of the present invention. It can be seen from FIG. 9 the full viewing angle dark-state light leakage distribution of the single-layered biaxial compensation film compensation structure, indicating that there is serious light leakage at phi=50°-70°, phi=110°-130°, phi=230°-250° and phi=290°-310°. Compared with the dark-state light leakage profile of the single-layered biaxial compensation film compensation structure in the existing technology as shown in FIG. 2, the region having serious dark-state light leakage has been close to the up-and-down vertical viewing angle, while the dark-state light leakage close to the horizontal viewing angle is significantly reduced, and thus contrast and definition close to the horizontal viewing angle can be effectively increased. Meanwhile, with only one layer of the biaxial compensation film 420 needed, the cost is not increased.

The delay of each of the optical diaphragms will be described in detail with reference to this example. In the display device, in order to ensure that the light leakage is concentrated near the up-and-down vertical viewing angle and the amount and range of light leakage are as small as possible, the delay value of the biaxial compensation film 420 is further regulated, or the delay values of the biaxial compensation film 420 and the first rear side TAC film 510 are further regulated at the same time. In the simulation process, the display device has for example the structure as shown in FIGS. 6-8; however, it should be understood that this structure is used only as an example, instead of for limiting the present invention. It is confirmed through simulation that the delay value thus obtained is likewise applicable to the corresponding optical diaphragm of other display devices, for example, the delay value here obtained of the front side biaxial compensation film 420 is likewise applicable to the biaxial compensation film of other display device according to the present invention; the VA liquid crystal unit 300 has a pretilt angle of 85° to 90°, excluding 90°, a liquid crystal pretwist in the four quadrants respectively of 45°, 135°, 225° and 315°, and a optical path difference LC Δnd within the range of (305.8, 342.3) nm, with the wavelength here at 550 nm; the blue light-YAG (Yttrium Aluminum Garnet) of LED spectrum is used as the light source, with the central luminance defined to be 100 nit and the light source distribution to be the Lambert distribution.

Figure 10:
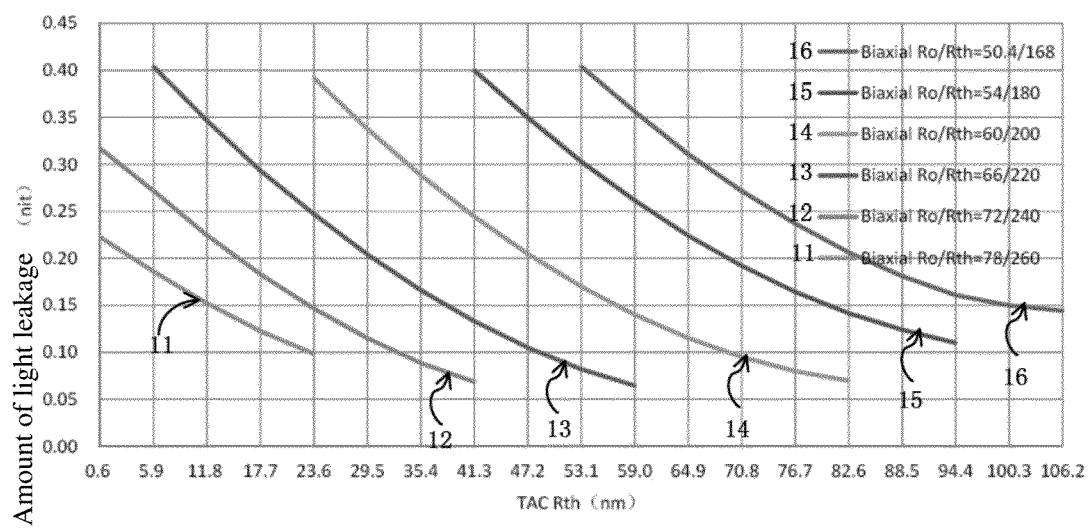
FIG. 10 is a curve of change of the amount of the light leakage of the display device as shown in FIG. 6 with the delay value.
Figure 11:
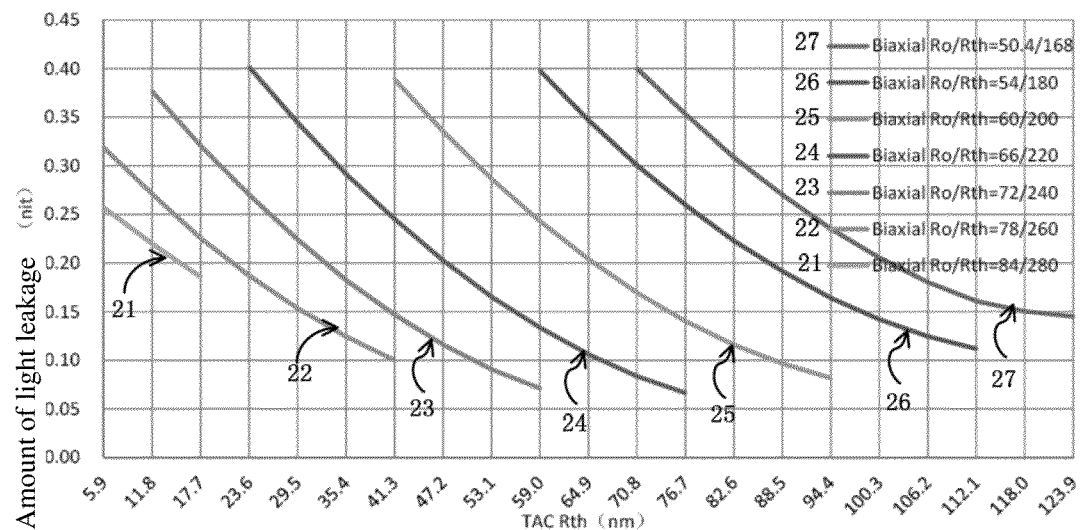
FIG. 11 is a curve of change of the amount of the light leakage of the display device as shown in FIG. 6 with the delay value.

The simulation results are for example as shown in FIGS. 10 and 11 by the curve of change of the amount of light leakage with the delay value, wherein FIG. 10 is a curve of change of the amount of light leakage when LC ΔND=305.8 nm and the pretilt angle is 89°, with the in-plane delay Ro and thickness direction delay Rth-b of the front side biaxial compensation film 420 as well as the thickness direction delay Rth-t of the first rear side TAC film 510 having different values; FIG. 11 is a curve of change of the amount of light leakage when LC ΔND=342.3 nm and the pretilt angle is 89°, with the in-plane delay Ro and thickness direction delay Rth-b of the front side biaxial compensation film 420 as well as the thickness direction delay Rth-t of the first rear side TAC film 510 having different values. In the drawings, the Biaxial Ro refers to the in-plane delay Ro of the front side biaxial compensation film 420, the Biaxial Rth refers to the thickness direction delay Rth-b of the biaxial compensation film 420, and the TAC Rth refers to the thickness direction delay Rth-t of the first rear side TAC film 510.

It was found in the simulation that at different pretilt angles, the delay values of the front side biaxial compensation film 420 and the first rear side TAC film 510 have influences on the dark-state light leakage that are consistent in trend. That is, at different pretilt angles, the minimum dark-state light leakage corresponds to the same range of delay values. According to the simulation results, the range of delay values of the front side biaxial compensation film 420 and the first rear side TAC film 510 can be obtained under the conditions that LC ΔND is within the range of (305.8, 342.3) nm, the pretilt angle is within the range of) (85°-90° (excluding 90°), and the dark-state light leakage is smaller than 0.2 nit (the dark-state light leakage value simulated when the pretilt angle=89°, not the actual measured value): the front side biaxial compensation film 420 has an in-plane delay Ro of 50.4-78 nm at the wavelength of 550 nm and a thickness direction delay Rth-b of 168-260 nm at the wavelength of 550 nm; the thickness direction delay Rth-t of the first rear side TAC film 510 at the wavelength of 550 nm has a minimum value Y1 and a maximum value Y2 that are respectively defined through the following formulas (1) and (2):

$$Y1=0.0041 \times Rth\text{-}b^2 - 2.6179 \times Rth\text{-}b + 408.46 \quad (1)$$

$$Y2=-0.0009 \times Rth\text{-}b^2 - 0.5472 \times Rth\text{-}b + 244.95 \quad (2).$$

It is known that the relation between the in-plane delay Ro and thickness direction delay Rth-b and the refractive index and thickness d of the front side biaxial compensation film 420 satisfies the following formulas (3) and (4):

$$Ro=(Nx-Ny) \times d \quad (3)$$

$$Rth\text{-}b=[(Nx+Ny)/2-Nz] \times d \quad (4)$$

Wherein Nx and Ny are the in-plane refractive index of the front side biaxial compensation film 420, and Nz is the thickness refractive index. Thus the delay value can be changed through the following three methods: changing the delay value by changing the thickness d; with the thickness d constant, changing the delay value by changing the refractive index; and regulating the delay value by simultaneously changing the thickness d and refractive index.

Figure 12:
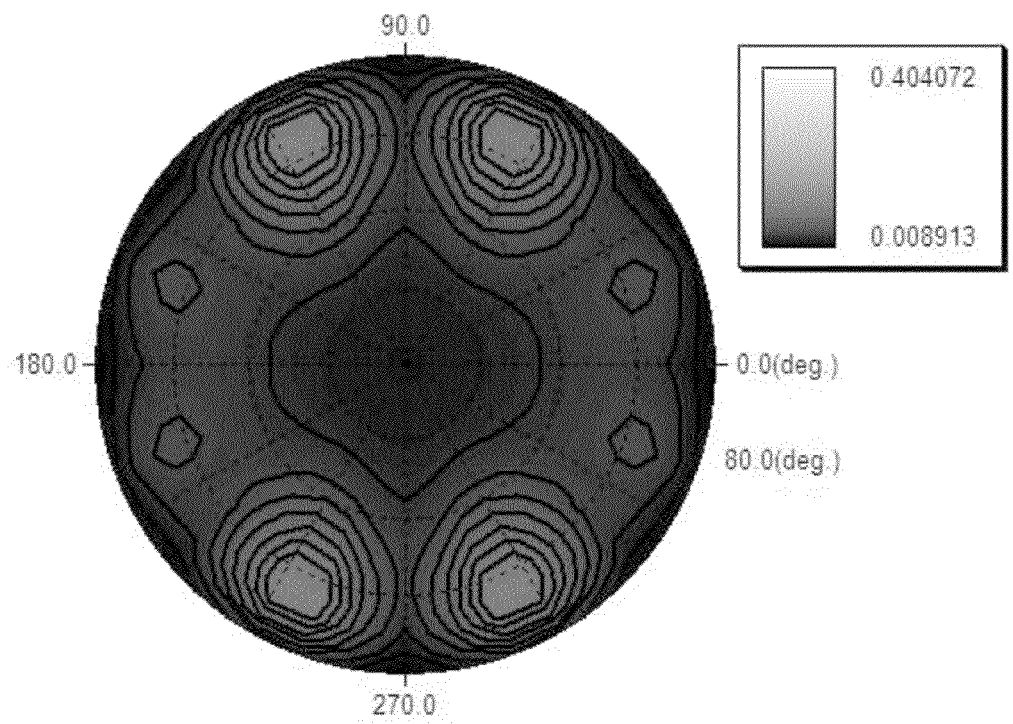
FIG. 12 is an isoluminance profile of the dark-state light leakage distribution of the display device as shown in FIG. 6 after adoption of the delay value according to the example of the present invention.

FIG. 12 is a dark-state light leakage profile of the display device according to the present invention after using the delay value according to the examples of the present invention. Wherein LC ΔND=315 nm, the pretilt angle is 89°, the compensation value Ro of the biaxial compensation film is 66 nm, Rth-b is 220 nm, the compensation value Rth-t of the first rear side TAC film 510 is 59 nm. Compared with the dark-state light leakage profile of the single-layered biaxial compensation film compensation structure in the existing technology as shown in FIG. 2, the dark-state light leakage of the improved display device is concentrated near the vertical viewing angle, the light leakage is concentrated within a smaller range of viewing angle, and the amount of light leakage is obviously smaller than the dark-state light leakage caused by the single-layered biaxial concentrated film compensation structure in the existing technology.

Figure 4:
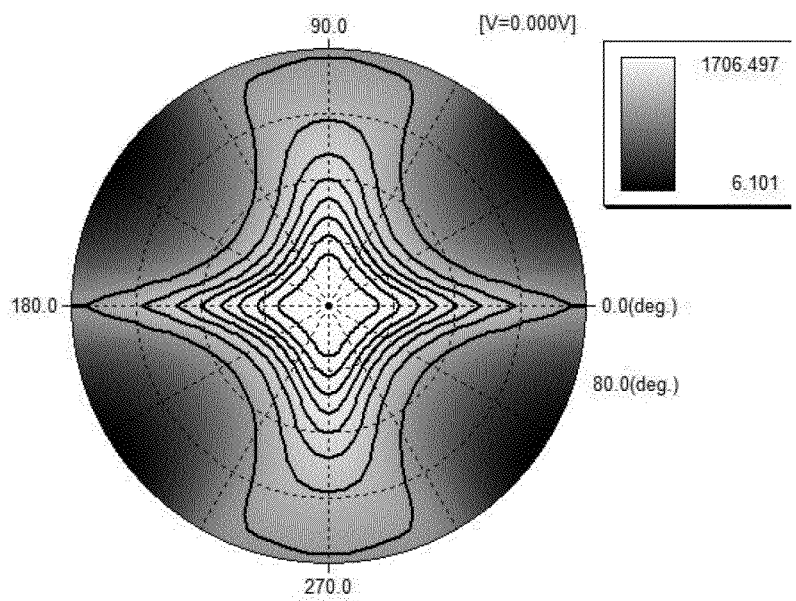
FIG. 4 is a full viewing angle iso-contrast profile of the single-layered biaxial compensation film compensation structure.
Figure 5:
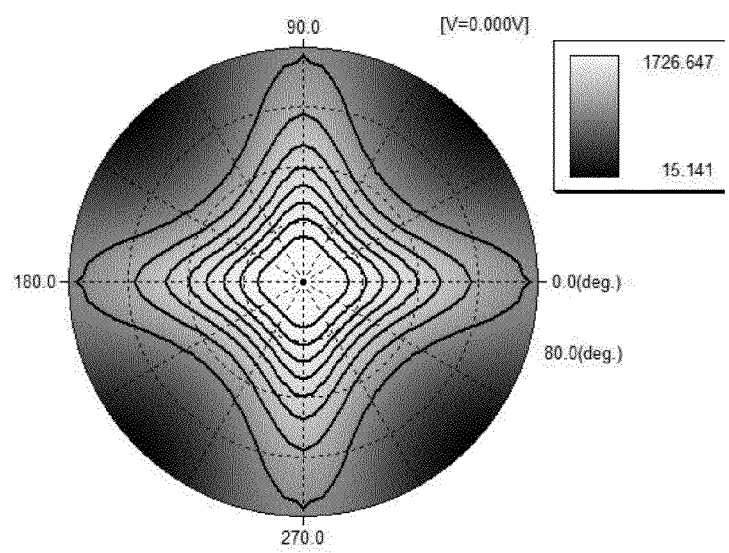
FIG. 5 is a full viewing angle iso-contrast profile of the double-layered biaxial compensation film compensation structure.
Figure 13:
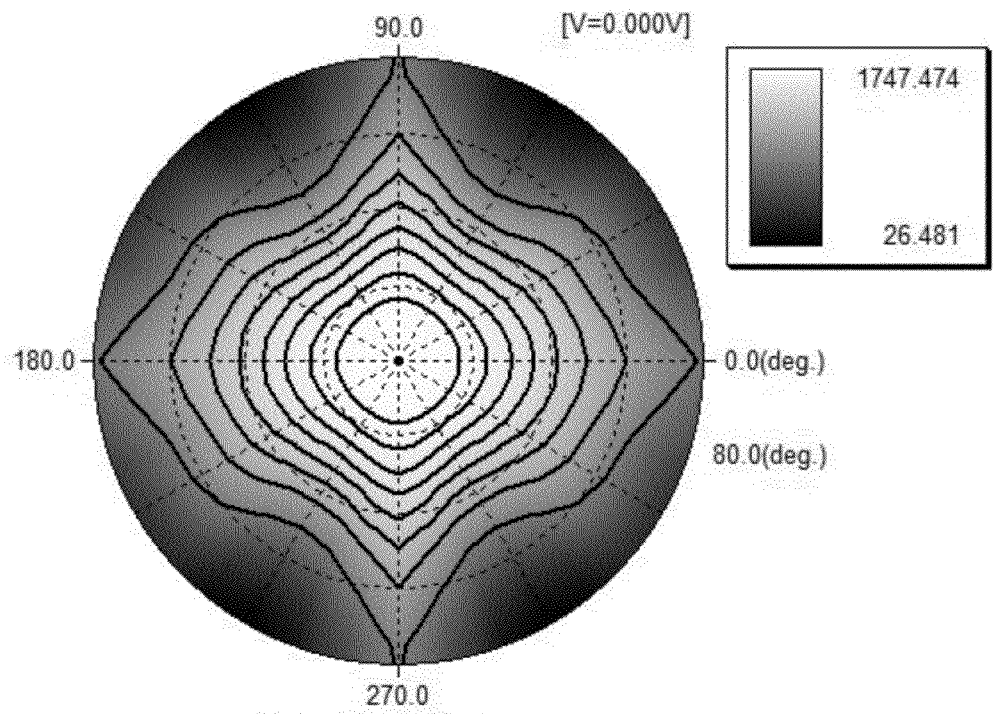
FIG. 13 is a full viewing angle iso-contrast profile of the display device as shown in FIG. 6 after adoption of the delay value according to the example of the present invention.

FIG. 13 shows the full viewing angle contrast profile of the display device according to examples of the present invention (the same display device as shown in FIG. 12); compared with FIG. 4, the contrast of this display device close to the horizontal viewing angle is significantly increased compared with that of the single-layered biaxial compensation film compensation structure close to the horizontal viewing angle as shown in FIG. 4, with the display effect further improved.

Figure 14:
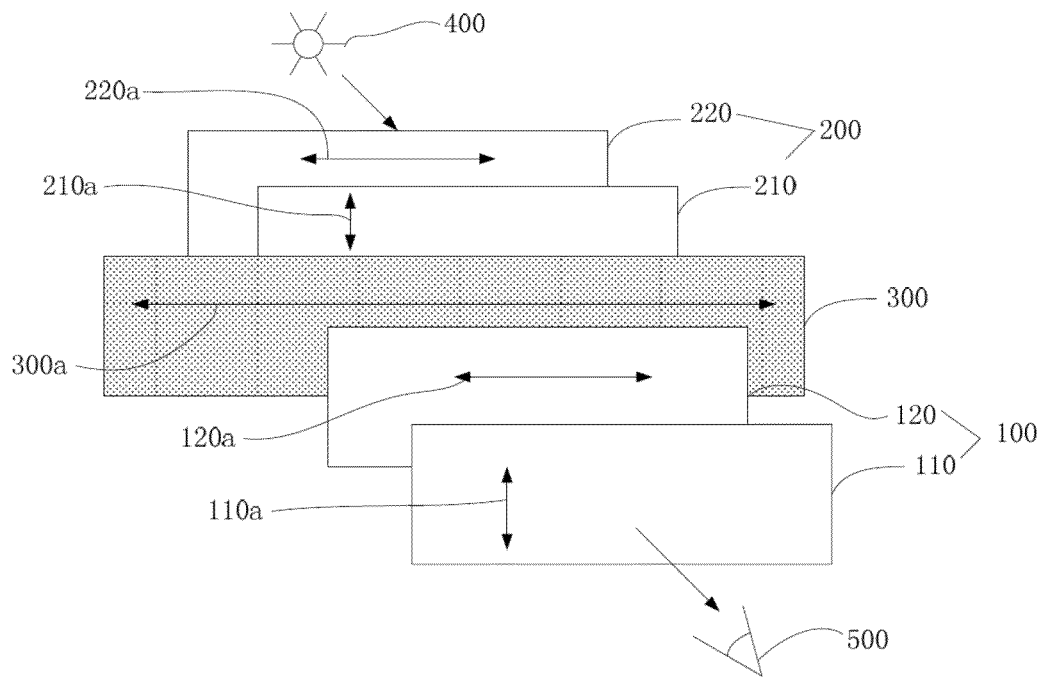
FIG. 14 is a structural schematic drawing of the display device of the second example according to the present invention.

FIG. 14 shows the display device of the second example according to the present invention, which comprises a front side polarizer 100 and a rear side polarizer 200 arranged at both sides of a VA liquid crystal unit 300. Wherein the front side polarizer 100 is arranged at the side in the light-exiting direction of the VA liquid crystal unit 300 (here the light-exiting direction is defined to be the direction of the backlight source 400 oriented to the viewer 500), including a front side polarization unit 110 as well as a second front side TAC film 120 arranged between the front side polarization unit 110 and the VA liquid crystal unit 300. The rear side polarizer 200 includes a rear side polarization unit 220 as well as a rear side biaxial compensation film 210 arranged between the rear side polarization unit 220 and the VA liquid crystal unit 300. Preferably, the slow axis 120a of the second front side TAC film 120 is perpendicular to the absorption axis of the front side polarization unit 110; and the slow axis 210a of the biaxial compensation film 210 is perpendicular to the absorption axis of the rear side polarization unit 220.

Different from the single-layered biaxial compensation film compensation structure in the existing technology, in the display device according to the examples of the present invention, the absorption axis 110a of the front side polarization unit 110 is perpendicular to the horizontal normal 300a of the VA liquid crystal unit 300; and the absorption axis 220a of the rear side polarization unit 220 is parallel to the horizontal normal 300a. In other words, compared with the single-layered biaxial compensation film compensation structure in the existing technology, both the absorption axis 110a of the front side polarization unit 110 and the absorption axis 220a of the rear side polarization unit 220 of the display device according to the examples of the present invention are deflected by 90°.

Figure 15:
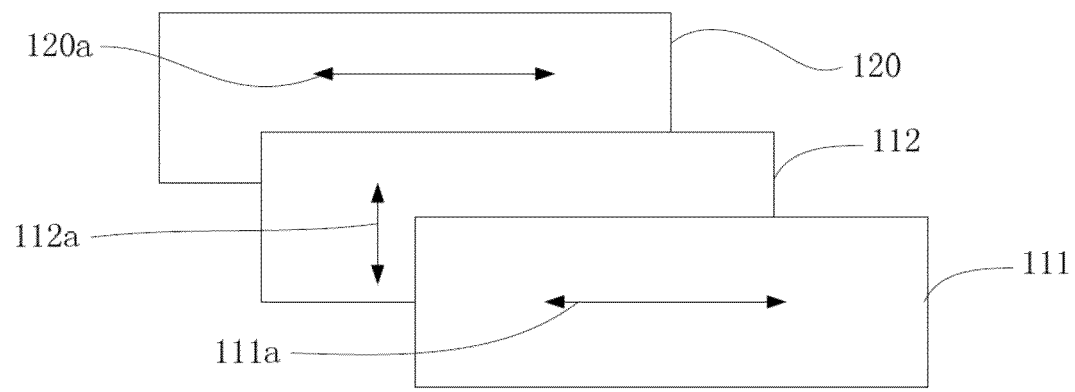
FIG. 15 is an exploded drawing of the front side polarizer 100 as shown in FIG. 14.

Specifically, FIG. 15 is an exploded drawing of the front side polarizer 100 as shown in FIG. 14, wherein the front side polarization unit of this front side polarizer 100 includes a first front side TAC film 111 as well as a front side PVA film 112 arranged between the first front side TAC film 111 and the second front side TAC film 120; wherein the absorption axis 112a of the front side PVA film 112 is perpendicular to the horizontal normal 300a, the slow axis 111a of the first front side TAC film 111 is perpendicular to the absorption axis 112a of the front side PVA film 112, and the slow axis 111a of the first front side TAC film 111 is parallel to the slow axis 120a of the second front side TAC film 120.

Figure 16:
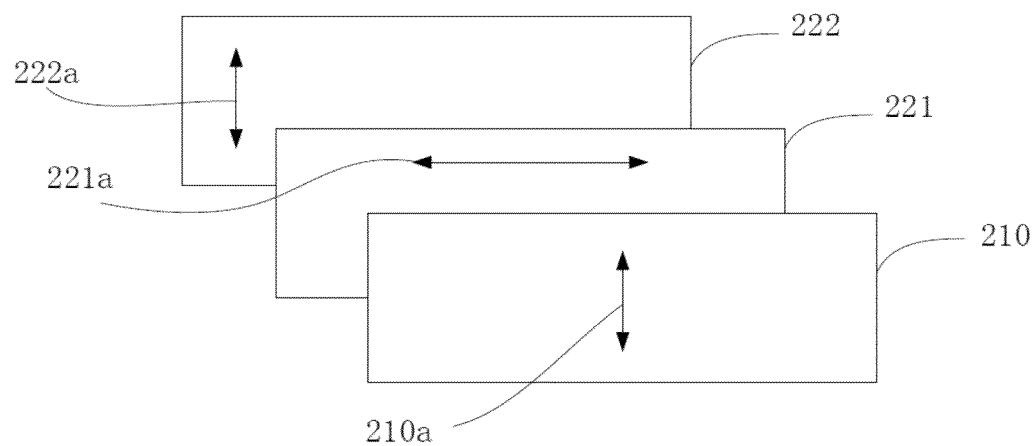
FIG. 16 is an exploded drawing of the rear side polarizer 200 as shown in FIG. 14.

FIG. 16 is an exploded drawing of the rear side polarizer 200 as shown in FIG. 14, wherein the rear side polarization unit 220 includes a second rear side TAC film 222 as well as a rear side PVA film 221 arranged between the second rear side TAC film 222 and the rear side biaxial compensation film 210. Wherein the absorption axis 221a of the rear side PVA film 221 is parallel to the horizontal normal 300a, and the slow axis 222a of the second rear side TAC film 222 is parallel to the slow axis 210a of the rear side biaxial compensation film 210 and perpendicular to the absorption axis 221a of the rear side PVA film 221.

Besides, in this example, the rear side biaxial compensation film 210 likewise has an in-plane delay Ro of 50.4-78 nm at the wavelength of 550 nm and a thickness direction delay Rth-b of 168-260 nm at the wavelength of 550 nm; the thickness direction delay Rth-t of the second front side TAC film 120 at the wavelength of 550 nm has a minimum value Y1 and a maximum value Y2 that are likewise respectively defined through the following formulas (1) and (2):

$$Y1=0.0041 \times Rth\text{-}b^2-2.6179 \times Rth\text{-}b+408.46 \quad (1),$$

$$Y2=-0.0009 \times Rth\text{-}b^2-0.5472 \times Rth\text{-}b+244.95 \quad (2).$$

It is likewise confirmed through simulation that in this example, the dark-state light leakage of the improved display device is concentrated near the vertical viewing angle, the light leakage is concentrated within a smaller range of viewing angle, and the amount of light leakage is obviously smaller than the dark-state light leakage caused by the single-layered biaxial concentrated film compensation structure in the existing technology. Besides, the contrast of this display device close to horizontal viewing angle is likewise significantly increased, with the display effect further improved.

It should be understood that the TAC (cellulose triacetate) film, PVA (polyvinyl alcohol) film, and biaxial film used in this application can be the products of any type currently commercially available, and will no longer be enumerated here in detail.

It can be seen from above that, by setting a suitable delay value in the display device, the amount of light leakage is significantly reduced compared with the existing single-layered biaxial compensation film compensation structure, with the contrast close to the horizontal viewing angle obviously increased and the display effect further improved.

Specifically, in the display device according to the first example of the present invention, through the substitution of the biaxial compensation film for the existing front side TAC film in the front side polarizer and the substitution of the TAC film for the existing biaxial compensation film in the rear side polarizer, the region having serious dark-state light leakage can be transferred from a close-to-horizontal viewing angle to a close-to-vertical viewing angle, which improves the display effect compared with the existing single-layered biaxial compensation film compensation structure. In the display device according to the second example of the present invention, by deflecting both the absorption axis of the front side polarization unit and the absorption axis of the rear side polarization unit by 90°, the region having serious dark-state light leakage can be transferred from a horizontal viewing angle to a vertical viewing angle, which improves the display effect compared with the existing single-layered biaxial compensation film compensation structure. Meanwhile, there is no addition of the number of layers of the biaxial compensation film by only using the single-layered biaxial compensation film, which reduces the cost compared with the existing double-layered biaxial compensation film compensation structure.

It should be understood that those skilled in the art can make improvement or transformation according to the above explanation, which shall all fall within the scope of protection of the claims of the present invention.

What is claimed is:

1. A display device, characterized in that it comprises a VA liquid crystal display unit as well as a front side polarizer and a rear side polarizer arranged respectively at two opposite sides of the VA liquid crystal display unit; wherein:
the VA liquid crystal display unit has an optical path difference Δnd of 324.3 nm to 305.8 nm at a wavelength of 550 nm;
the front side polarizer is arranged at a side in a light-exiting direction of the VA liquid crystal unit;
the front side polarizer includes a front side polarization unit as well as a second front side TAC film arranged between the front side polarization unit and the VA liquid crystal unit; the absorption axis of the front side polarization unit is perpendicular to the horizontal normal of the VA liquid crystal unit;
the rear side polarizer includes a rear side polarization unit as well as a biaxial compensation film arranged between the rear side polarization unit and the VA liquid crystal unit; the absorption axis of the rear side polarization unit is parallel to the horizontal normal; and the biaxial compensation film has an in-plane delay Ro of 50.4-78 nm at the wavelength of 550 nm and a thickness direction delay Rth-b of 168-260 nm at the wavelength of 550 nm;
the rear side polarization unit includes a second rear side TAC film as well as a rear side PVA film arranged between the second rear side TAC film and the biaxial compensation film; and
the absorption axis of the rear side PVA film is perpendicular to the slow axis of the biaxial compensation film, and the slow axis of the second rear side TAC film is parallel to the slow axis of the biaxial compensation film.

2. The display device according to claim 1, characterized in that: a thickness direction delay Rth-t of the second rear side TAC film at the wavelength of 550 nm has a minimum value Y1 and a maximum value Y2 that are respectively defined through the following formulas:

$$Y1=0.0041 \times Rth\text{-}b^2-2.6179 \times Rth\text{-}b+408.46,$$

$$Y2=-0.0009 \times Rth\text{-}b^2-0.5412 \times Rth\text{-}b+244.95.$$

3. The display device according to claim 1, characterized in that the front side polarization unit includes a first front side TAC film as well as a front side PVA film arranged between the first front side TAC film and the second front side TAC film; wherein:

the absorption axis of the front side PVA film is perpendicular to the slow axis of the second front side TAC film, and the slow axis of the first front side TAC film is parallel to the slow axis of the second front side TAC film.

4. The display device according to claim 1, characterized in that the VA liquid crystal unit is a multi-quadrant liquid crystal unit.

* * * * *